Jan. 18, 1966   L. P. O'CONNOR, JR   3,229,618
REFUSE DISPOSAL APPARATUS AND SYSTEM
Filed Aug. 28, 1962   6 Sheets-Sheet 1

INVENTOR:
LEON P. O'CONNOR, JR.
BY Howson & Howson
ATTYS.

Jan. 18, 1966  L. P. O'CONNOR, JR  3,229,618
REFUSE DISPOSAL APPARATUS AND SYSTEM
Filed Aug. 28, 1962  6 Sheets-Sheet 2

INVENTOR:
LEON P. O'CONNOR, JR.
BY Howson & Howson
ATTYS.

Jan. 18, 1966 L. P. O'CONNOR, JR 3,229,618
REFUSE DISPOSAL APPARATUS AND SYSTEM
Filed Aug. 28, 1962 6 Sheets-Sheet 6

INVENTOR:
LEON P. O'CONNOR, JR.
BY Howson & Howson
ATTYS.

United States Patent Office 3,229,618
Patented Jan. 18, 1966

3,229,618
REFUSE DISPOSAL APPARATUS AND SYSTEM
Leon P. O'Connor, Jr., Levittown, Pa., assignor to O'Connor Systems, Inc., New York, N.Y., a corporation of Delaware
Filed Aug. 28, 1962, Ser. No. 219,950
13 Claims. (Cl. 100—51)

The present invention relates to a system and apparatus for handling waste material in a highly efficient, economical and sanitary manner.

The system and apparatus of the present invention are especially useful for handling waste material in industrial plants where a comparatively large volume of waste material is accumulated daily. Presently in some industrial plants, waste material is deposited in containers located throughout the plant, which containers are periodically collected and taken to a pickup area. At the pickup area the containers are emptied into an open compartment of a collection vehicle which when filled to capacity, is driven to a final disposal area such as an incinerator where the waste material is unloaded. Handling of waste material in this manner is inefficient and costly since the full capacity of the waste compartment of the collection vehicle is not being utilized to full advantage, there being only a small amount of compaction of the waste material in the compartment resulting from the weight of the waste material. Accordingly in a great number of instances, the collection vehicle has to be loaded, unloaded and driven between the plant and final refuse disposal area several times during the course of a day to handle the waste material for a given plant. Furthermore spillage of the waste material during loading and transport of the collection vehicle are objectionable. In some instances, collection vehicles having mechanized loaders are employed. However, the compaction efficiency of these vehicles is limited and they usually have only a capacity of about three tons. Accordingly the increase in compaction efficiency over open vehicles is offset by the increased cost of a vehicle having a mechanized loader and its smaller capacity. It is noted that loads of mechanized collection vehicles adds a considerable amount of weight to the vehicle, thereby decreasing the payload which the vehicle can accommodate. Further since these vehicles, similar to the open compartment vehicles, require a driver and at least two other men to load and unload and since it is also necessary during a day's operation to load and unload the vehicle several times, it is readily apparent that this operation is extremely inefficient because of the man hours used and the cost of driving the vehicles to a distant final disposal area.

Accordingly it is an object of the present invention to provide a system and apparatus for handling waste material which is much more efficient, economical and sanitary than the present methods for handling waste material. To this end the present invention in its broadest aspect contemplates the provision of a packer unit located at one or more strategic areas in an industrial plant, which unit is adapted to receive waste material and automatically transfer and compact it into a receiver of substantial size which in turn when filled to capacity, may be transported with other receivers to be dumped at a final disposal area. The compaction efficiency of the packer unit of the present invention far exceeds that of conventional collection vehicles including those having mechanized loaders so that whereas prior to the present invention, several trips of a collection vehicle manned by several workers were required to handle the waste material, now only a single drive is required to haul the packed receivers to the distant final disposal area. Additionally the packer unit of the present invention is of much more simplified construction and may be manufactured and operated more economically than collection vehicles having mechanized loaders. Further handling of the waste material is minimized thereby providing a more sanitary operation.

More specifically, the packer unit of the present invention includes a refuse transfer chamber adapted to receive waste material and a packer plate mounted for reciprocating movement in the transfer chamber operable to discharge waste material through a discharge outlet at one end of the chamber into a receiver having an entrance opening aligned with the transfer chamber discharge outlet. By this arrangement, waste material may be deposited directly into the packer unit whereby the packer plate transfers it directly and quickly into the receiver and firmly compacts the refuse to fill the receiver to maximum capacity thereby minimizing handling of the waste material.

Another feature of the packer unit of the present invention is the provision of retainer means for the receiver adapted to retain the compacted waste material therein when the receiver has been filled to capacity. To the end according to one form of retainer means, a retainer plate carried by the packer plate is provided which may be released from the packer plate and secured over the entrance opening in the receiver when it has been compacted to capacity thereby eliminating the problem of spillage. Another form of retainer means comprises the use of bars over the entrance opening in the receiver to retain compacted waste material therein. Additionally the packer plate includes shear means whereby possible jamming of the unit due to large bulky waste material is obviated and trouble-free operation of the packer unit is assured. Accordingly it is apparent that handling waste material in accordance with the present invention is much more economical, efficient and sanitary than prior methods discussed above.

With the foregoing in mind, an object of the present invention is to provide an improved system and apparatus for handling waste material in a highly efficient, economical and sanitary manner.

Another object of the present invention is to provide a packer unit for transferring and compacting waste material in a receiver which is of rugged, economical construction and which operates efficiently with a minimum of maintenance.

A more detailed description of the refuse handling system and apparatus of the present invention is hereinafter more fully set forth and described with reference to the accompanying drawings, in which.

Figures 1, 7, 16:
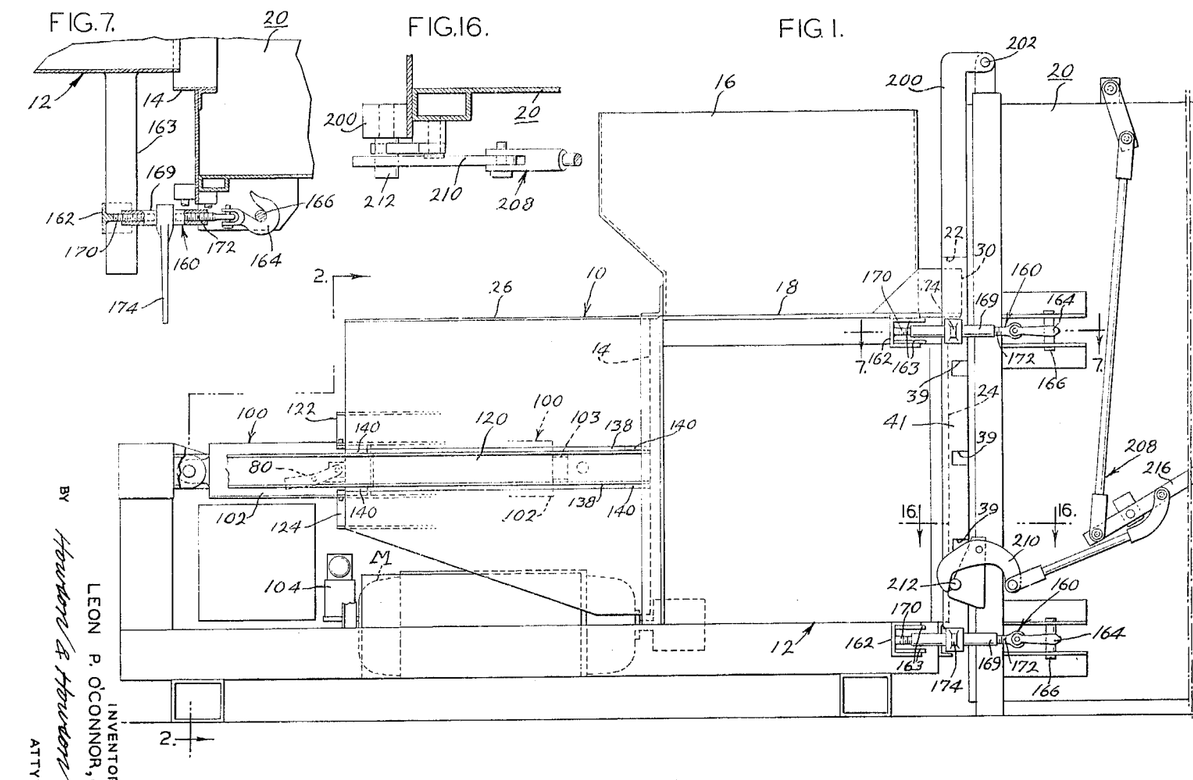
FIG. 1 is a side elevational view of the refuse packer of the present invention and a receiver for receiving the refuse material from the packer.
FIG. 7 is an enlarged sectional view taken on line 7—7 of FIG. 1.
FIG. 16 is an enlarged sectional view taken on line 16—16 of FIG. 1.
Figures 2, 8:
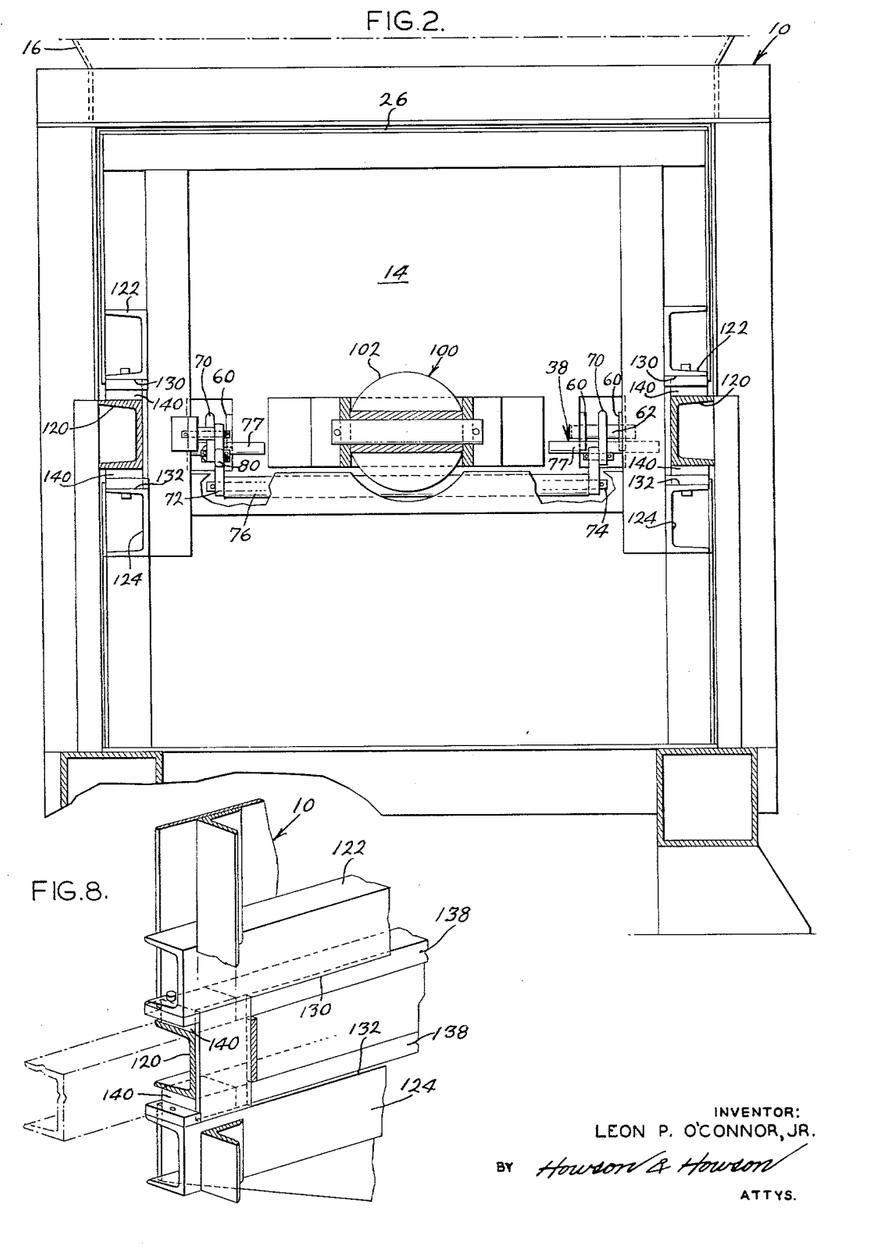
FIG. 2 is an enlarged sectional view taken on line 2—2 FIG. 1.
FIG. 8 is a perspective view of the guide means for the packer plate.
Figure 13:
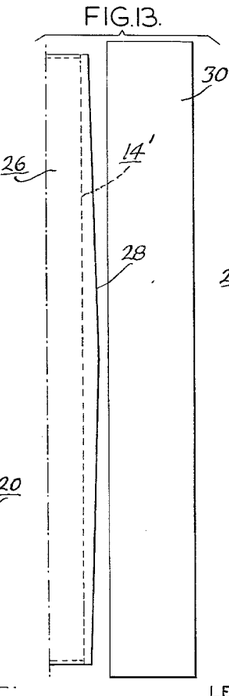
FIG. 13 is a view similar to FIG. 12 showing the packer plate short of its fully extended limit position.

With reference to the drawings and particularly FIG. 1 thereof, there is shown the basic system and apparatus of the present invention for handling waste material. Considering the system and apparatus in terms of function and with reference to the primary component elements and their respective functions, there is provided a packer unit generally designated by the numeral 10 including a refuse transfer chamber 12 and a packer plate 14 adapted for reciprocating movement lengthwise of the transfer chamber 12 between a retracted limit position R wherein waste material from a hopper 16 may be received in the transfer chamber 12 through an open top 18 therein and an extended limit position E to transfer a charge of the waste material from the transfer chamber 12 to a receiver 20 having a receiving compartment and an entrance opening 22 at one end thereof aligned with the discharge outlet 24 in the transfer chamber 12. The packer plate 14 mounts a shield 26 which projects rearwardly from the top edge of the packer plate 14 and which serves to close the open top 18 of the transfer chamber 12 during actuation of the packer plate 14 from the retracted to the extended position. This arrangement prevents accumulation and spillage of waste material behind the packer plate 14 and permits waster material to be deposited into the hopper 16 of the packer unit even when the packer plate 14 is being cycled between the limit positions. Further as illustrated for example in FIG. 13, the front edge of the shield 26 projects forwardly beyond the front face of the packer plate 14 and diverges rearwardly from approximately its midpoint to provide a wedge-shaped cutting edge 28.

Figure 3:
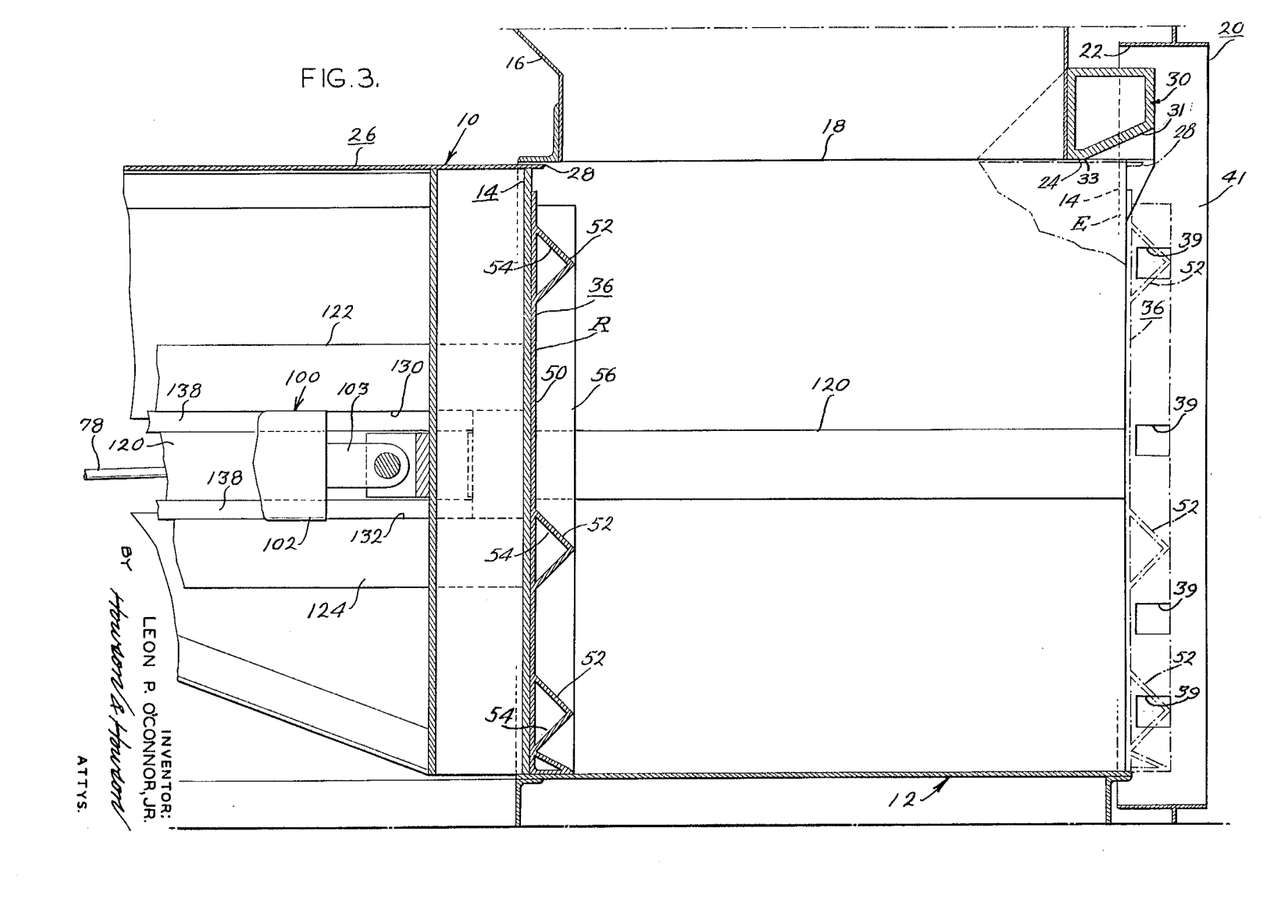
FIG. 3 is an enlarged fragmentary transverse sectional view through the packer showing the extreme limit positions of the packer plate.

The cutting edge 28 cooperates closely with a stationary beam 30 extending transversely relative to the direction of movement of the packer plate adjacent the discharge outlet 24 to shear refuse trapped between the cutting edge 28 and beam 30 thereby preventing jamming of the unit during movement of the packer plate 14 from the extended positions to transfer and compact waste material into the receiver 20. As illustrated, for example in FIG. 3, the face 31 of the shear beam 30 which confronts the discharge outlet 24 in the transfer chamber 12 is disposed at an angle to a horizontal plane to provide an edge 33 which cooperates with the cutting edge 28 to shear refuse material.

An important feature of the present invention is the provision of means for retaining the waste material in the receiver 20 when it has been filled to maximum capacity. To this end as illustrated, for example in FIGS. 4–6, inclusive, the retainer means comprises a retainer plate 36 which is secured to the packer plate by a latch mechanism 38 and may be detached therefrom and secured over the entrance opening in the receiver 20 when the receiver has been filled to maximum capacity. By this arrangement waste material may be loaded continuously into the receiver 20 from the packer unit with the retainer plate 36 secured to the packer plate 14 during cycling thereof between extended and retracted positions. When receiver 20 has been filled to maximum capacity, the packer plate 14 is maintained in the extended position E whereby the latch mechanism 38 is actuated to release the retainer plate 36 which then is adapted to be secured over the entrance opening 22 in the receiver. The receiver is then ready for transport to a final disposal area. The next receiver to be filled and a retainer plate 36 for the receiver may then be positioned relative to the packer unit to prepare the receiver for loading.

Figure 9:
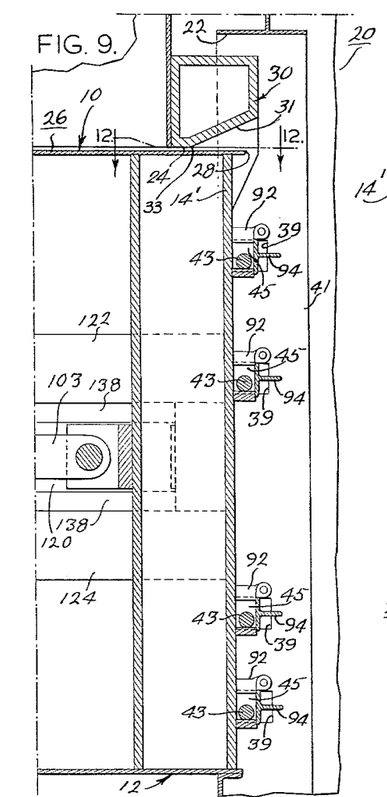
FIG. 9 is a fragmentary transverse sectional view similar to FIG. 4 showing a modified form of packer plate in accordance with the present invention in its forward extended limit position.
Figure 10:
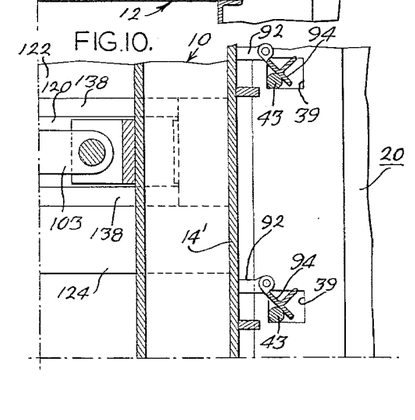
FIG. 10 is a view similar to FIG. 9 showing the packer plate short of its fully extended limit position.
Figure 11:
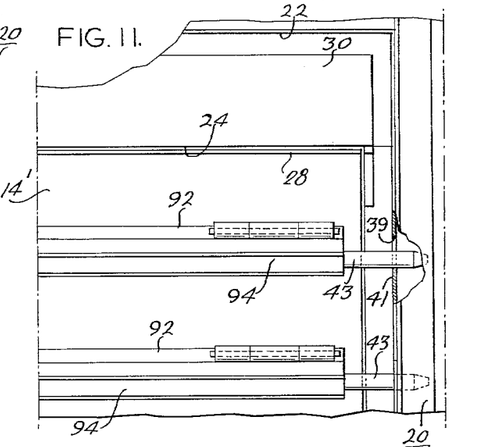
FIG. 11 is a fragmentary front elevational view of the packer plate shown in FIG. 9.
Figure 12:
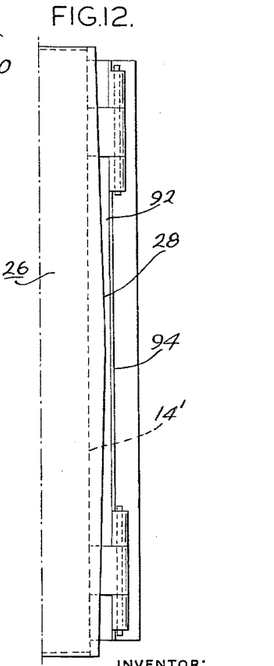
FIG. 12 is a sectional view taken on line 12—12 of FIG. 9.

In accordance with another form of retainer means shown in FIGS. 9–11, the packer plate 14' is provided on its front face with a series of horizontally extending vertically spaced pockets 45 which in the fully extended position of the packer plate 14' are aligned with confronting openings 39 in a flange 41 surrounding the entrance opening in the receiver. By this arrangement, retainer rods 43 may be positioned between the confronting openings 39 through the pockets 45 to retain the compacted waste material in the receiver.

Considering now the specific structural details of the packer unit of the present invention, the retainer plate 36 includes a generally rectangular wall 50 of substantially the same peripheral dimension as the packer plate 14 and the entrance opening 22 in the receiver, which mounts on its front face a series of horizontally extending, vertically spaced V-shaped channel members 52 defining passageways 54 and a series of strengthening ribs 56 extending transversely of the channel members 52. A pair of tapered rearwardly projecting lugs 60, each carrying a pin 62 are mounted on the rear face of the wall 50 and tapered channel openings 64 are provided in the packer plate 14 to receive the lugs 60 to locate the retainer plate 36 relative to the packer plate 14.

Figure 4:
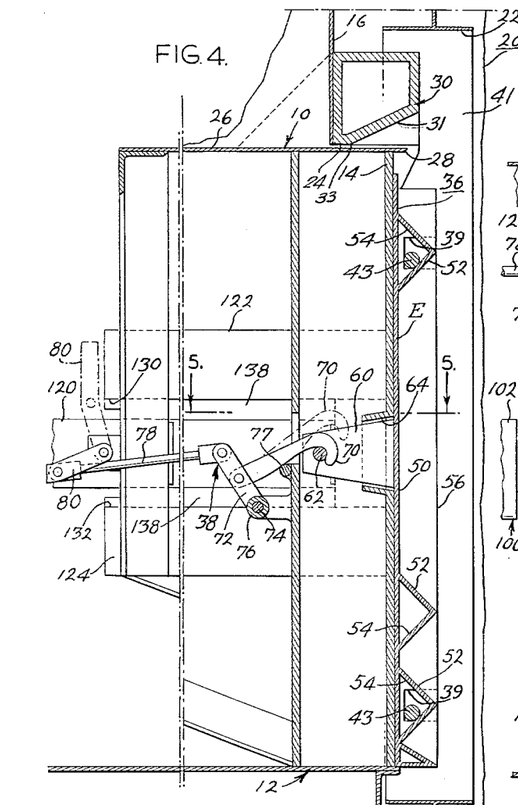
FIG. 4 is a fragmentary transverse sectional view showing the details and arrangement of the latch mechanism for detachably securing the retainer plate to the packer plate.
Figure 5:
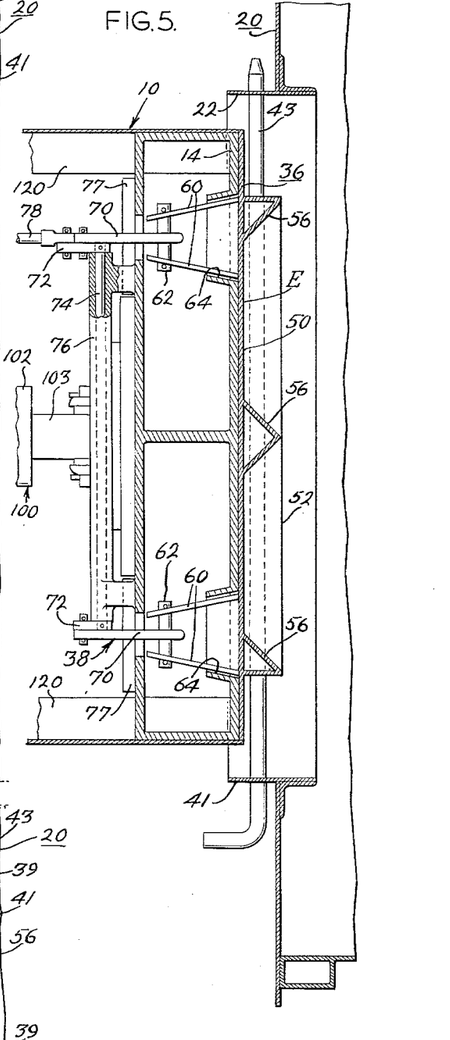
FIG. 5 is a fragmentary sectional view of the latch mechanism taken on line 5—5 of FIG. 4.
Figure 6:
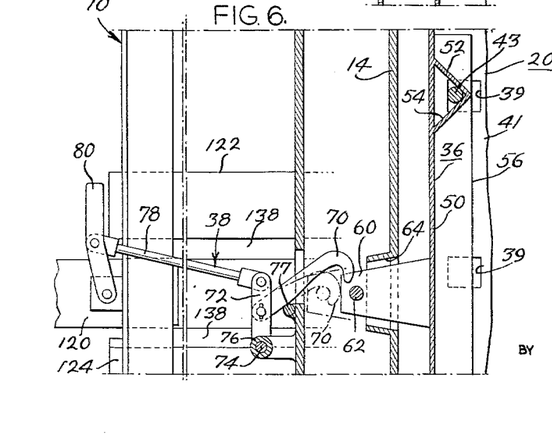
FIG. 6 is a fragmentary sectional view similar to FIG. 4 showing the retainer plate partially removed from the packer plate.

The latch mechanism 38 for detachably securing the retainer plate on the front face of the packer plate in the position shown in FIGS. 4 and 5 includes hook members 70 selectively actuatable simultaneously between a locking position engaging the pins 62 (indicated in solid lines in FIG. 4) to retain the retainer plate on the packer plate and a position out of engagement with the pins 62 (broken lines in FIG. 4) to permit the retainer plate 36 to be detached from the packer plate 14. To this end each of the hooks 70 is pivotally mounted at its terminal end approximately to the midpoint of a link 72, the links 72 being secured to opposite ends of a shaft 74 rotatably carried by a sleeve 76 secured to the rear face of the packer plate 14. As illustrated in FIGS. 4 and 6, the hook members 70 rest on a cam bar 77 mounted on the rear face of the packer plate 14. A connecting rod 78 is pivotally connected at one end to the tip of one of the links 72 and at its opposite end along the length of a crank arm 80 pivotally mounted to the frame of the packer unit adjacent one side thereof within easy reach of the operator. The crank arm 80 is actuatable between the solid line position (FIG. 4) wherein the hook members 70 lock the retainer plate 36 to the packer plate 14 during cycling of the packer plate 14 between limit positions R and E and may be moved to the broken line position wherein the hook members ride up on the cam bar 77 to disengage the pins 62 and release the retainer plate 36. Accordingly when the receiver 20 has been filled to maximum capacity, the packer plate 14 is held in the fully extended position to retain the refuse in the receiver. It is noted that in this position the passageways 54 are aligned with the openings 39 in the flange 41 surrounding the entrance opening 22 in the receiver 20 whereby retaining bars 43 may be positioned through the passageways between the openings 39 as shown in FIG. 5. Accordingly the crank arm may be actuated to release the retainer plate 36 whereby it is retained over the entrance opening by the bars 43 as shown in FIG. 6. By this arrangement the receiver 20 may be filled to maximum capacity and the compacted refuse retained therein and spillage of the contents of the receiver is obviated.

Another arrangement facilitating retention of compacted waste material in the receiver when the receiver has been filled to capacity is illustrated in FIGS. 9–11 inclusive. In lieu of the retainer plate 36 the packer plate 14' has on its front face the series of horizontally extending, vertically spaced pockets 45, each of which is defined by a pair of spaced protruding members 92 and a cover flap 94 pivotally mounted to one of the members 92. Thus when the receiver is filled to maximum capacity and the packer plate 14' is in the fully extended position wherein the pockets 45 are aligned with the openings 39 in the flange 41, the retainer rods 43 may be inserted between the aligned openings as shown in FIG. 9. With the retainer rods in place, the packer plate 14' may be retracted, the cover flaps 94 releasing the rods as illustrated in FIG. 10.

The specific means guiding the packer plate for movement lengthwise of the transfer chamber between retracted and extended positions comprises a pair of elongated channel shaped stationary guide members 120 at opposite sides of the packer unit and a pair of spaced apart upper and lower slide members 122 and 124 projecting rearwardly of the packer plate adjacent opposite side edges thereof. The upper and lower slide members of each pair have confronting faces 130 and 132 respectively which carry oilless bearing strips 138, in the present instance, made out of wood mounted between bronze blocks 140 adjacent outer extremities of the confronting surfaces of the slide members. This arrangement provides maintenance free, durable bearing surfaces between the slide and guide members and also guides the packer plate against cocking or skewing during cycling thereof between extended and retracted positions.

The packer plate 14 is actuatable selectively between retracted and extended positions by a hydraulic actuator 100 comprising a cylinder 102 and a piston rod 103 mounted for axial movement in the cylinder and connected at its free end to the rear face of the packer plate 14.

Figure 14:
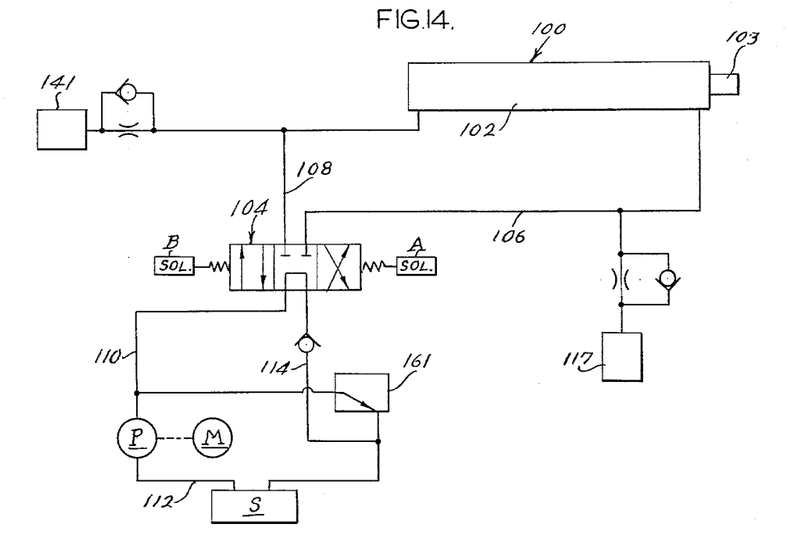
FIG. 14 is a schematic view of the hydraulic circuit for actuating the packer plate between limit positions.

The hydraulic system for effecting actuation of the piston rod and packer plate is shown schematically in FIG. 14 and includes a main control valve 104 connected through a pair of lines 106 and 108 to the inner and outer ends respectively of the cylinder 102. A conventional hydraulic pump P operated by a motor M is connected at its delivery or pressure side to the control valve 104 through a line 110 and at its intake side to a sump S through a line 112. A line 114 connects the control valve 104 to the sump S. The control valve 104 is a conventional 4-way valve including a spool (not shown) actuatable upon energization of a solenoid A to permit flow of fluid under pressure from the line 110 to the line 108 and the rear end of the cylinder to advance the packer plate 14 to the extended position E and actuatable upon energization of a solenoid B to permit flow of fluid under pressure to the line 106 to retract the packer plate to the retracted position R.

In the present instance, the control valve 104 is adapted normally to cycle the packer plate 14 from the retracted position R to the fully extended position E and return it to the retracted position R. The electric circuit for effecting cycling of the packer plate 14 through the control valve 104 in this manner is shown schematically in FIG. 15. The circuit includes a starting motor S for the motor M connected to a source of electrical energy through leads 111 and 113. A normally closed emergency switch 115, a normally closed pressure sensing switch 117 energized to open at a predetermined pressure, in the present instance 500 p.s.i. and a main starting switch 119 are connected in series in the lead 111.

Figure 15:
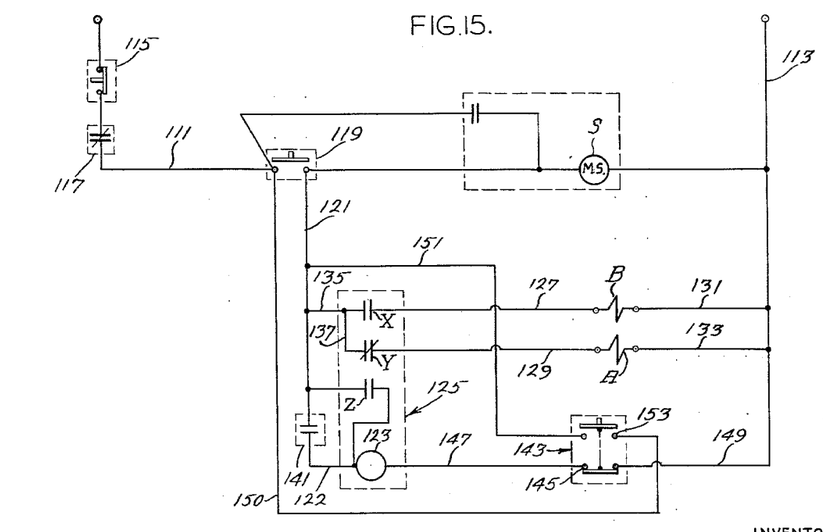
FIG. 15 is an electrical schematic showing the circuit for actuating the various elements of the hydraulic circuit of FIG. 14.

The main starting switch 119 is connected through a lead 121 to a normally open pressure switch 141 energized to close at a predetermined pressure of, in the present instance, 1500 p.s.i. which switch 141 is in turn connected through a lead 122 to the coil 123 of a relay 125 having contacts X, Y and Z. The contacts X and Y of the relay are connected to solenoids A and B respectively through leads 127 and 129, the solenoids A and B being connected through leads 131 and 133 to the lead 113. The contact Z of the relay is connected across the pressure switch 141 and the contact Y is connected through branch lead 137 to the lead 135.

Accordingly, assuming that the packer plate 14 is in the retracted position R, the piston rod 103 is fully retracted in the cylinder 102 and when it is desired to move a charge of waste material from the transfer chamber 12 to the receiver 20, the main starting switch 119 is closed which through the leads 121, 137, normally closed contact Y and lead 129 energizes the solenoid A whereby the spool of the main control valve 104 is actuated to a position to permit flow of fluid under pressure from the pump P through the lines 110 and 108 to the rear end of the cylinder 102. Accordingly, the piston rod is actuated to an extended position whereby the packer plate 14 is also moved to the extended position. When the packer plate has reached the fully extended position and the piston rod 102 has reached its maximum stroke, the pressure in the line 108 builds up and when it reaches a pressure of 1500 p.s.i., the pressure switch 141 is closed and the coil of the relay energized whereby the contacts X and Z of the relay are closed and the contact Y is opened.

Accordingly the solenoid A is de-energized and the solenoid B is energized whereby the spool of the valve 104 is actuated to a position to permit flow of fluid under pressure from the line 110 through the valve 104 and line 106 to the forward end of the cylinder 102. In this position of the valve 104 the line 108 is in fluid communication with the line 114 to permit fluid from the rear end of the cylinder to return to the sump S. When the piston rod 103 has been fully retracted, the packer plate 14 is in the retracted position and pressure in the line 106 starts to build up. When the pressure reaches 500 p.s.i., the pressure sensing switch 117 is opened whereby the motor M is shut off.

If desired, the packer plate 14 may be moved to the fully extended position and held in that position, for example, to facilitate securing of the retainer plate to the receiver when the receiver has been filled to maximum capacity. To this end a double pole, double throw switch 143 is provided in the electric circuit, the normally closed contacts 145 of which are connected through leads 147 and 149 between the coil of the relay and the lead 113 respectively. Leads 150 and 151 connect the normally open contacts 153 of the switch 143 to the main starting switch 119 and the lead 121. Accordingly when it is desired to advance the packer plate 14 to the extended position E, the forward switch 143 is actuated to close the contacts 153 and simultaneously open the contacts 145. Accordingly the coil 123 of the relay 125 is de-energized which in turn opens contacts X and Z thereof to cut out or bypass the pressure switch 141. Since the contact Y of relay 125 remains closed, the solenoid A is energized whereby the spool of the valve 104 is actuated to a position to permit flow of fluid under pressure to the rear end of the cylinder 102 to advance the packer plate to its extended limit position.

Accordingly when the piston rod 103 reaches its maximum stroke, and pressure starts to build up in the line 108, the switch 141 will not reverse the piston rod 103 as described above. In order to protect the unit, a pressure relieve valve 161 is provided in the line 110 actuatable in the present instance at 1800 p.s.i. to vent fluid to the sump S. When the forward switch is released, contacts 145 and pressure switch 141 close thereby energizing the coil and returning the packer plate to the retracted position. It is noted that the forward switch arrangement is employed to compact the final increment of waste material into the receiver 20 in situations where the final increment would cause a pressure in the line 108 during the advance stroke sufficient to reverse the packer plate 14 prior to the packer plate 14 reaching the fully extended position E.

The operation of the system and apparatus of the present invention for handling waste material is as follows. If the retainer plate is being employed, the first step in preparing the unit for operation is to attach the retainer plate to the packer plate 14 by manipulation of the latch mechanism 38. This is done most conveniently with the packer plate 14 in the fully extended position. Thereafter the receiver 20 is positioned adjacent the packer unit with its entrance opening aligned with the transfer chamber discharge outlet as shown in FIG. 1. In order to maintain the packer unit 10 and receiver 20 in the position shown to prevent displacement of the receiver while refuse is being compacted therein, adjustable fasteners 160 are provided each of which as illustrated, comprises a C-shaped clamp 162 engaging a bracket 163 projecting from the side wall of the transfer chamber, a hook member 164 adapted to engage a pin 166 on the side of the receiver and an internally threaded collar 169 connecting threaded stubs 170 and 172 mounted on the C-shaped clamp 162 and hook member 164 respectively. A ratchet handle 174 is connected to the collar 169 to turn the same when it is desired to tighten or loosen the fastener.

With the packer unit 10 and receiver 20 aligned as shown in FIG. 1, waste material may be deposited into the transfer chamber 12 through the hopper 16. When the chamber has been filled the packer plate 14 is actuated from the retracted to the extended position to transfer and compact refuse in its path into the receiver by closing the start switch 119 whereby the solenoid A is energized which through the main valve 104 establishes fluid communication between the lines 110 and 108 to permit flow of fluid under pressure from the pump P to the inner end of the cylinder 102 and establishes communication between the lines 106 and 114 to permit flow of fluid from the outer end of the cylinder 102 to the sump S. Accordingly the piston rod 103 is extended and the packer plate 14 is moved toward the extended position E. The packer plate 14 usually moves to the fully extended position E and when the pressure in the line 108 reaches 1500 p.s.i., the pressure sensing switch 141 is energized whereby the solenoid A is de-energized and simultaneously the solenoid B is energized to reverse flow in the lines 106 and 108 and thereby move the packer plate 14 to the retracted position R. When the packer plate 14 has returned to the fully retracted position and the pressure in the line 106 reaches 500 p.s.i., the pressure switch 117 opens the circuit to shut off the motor M. The packer plate 14 is cycled in the above manner until the receiver has been filled to capacity.

If desired, the packer plate 14 may be continuously cycled several times by modifying the electrical circuit to include a timer whereby the pressure switch 117 instead of cutting off the motor M after one complete cycle operates to repeat the cycle in the same manner as the pressure switch 141. When the receiver 20 has been filled to maximum capacity, the forward switch 143 is actuated to move and hold the packer plate in the fully extended position. In this position the latch mechanism 38 is actuated to release the retainer plate and the retainer rods are employed to secure the retainer plate 36 over the entrance opening in the receiver 20. Thereafter the receiver 20 is detached from the packer unit and is ready to be hauled to the final disposal area to be unloaded. As mentioned previously, during the forward stroke of the packer plate, the cutter cooperates with the shear beam to prevent jamming of the unit and the shield 26 prevents refuse in the hopper from dropping behind the packer plate and retains it above the transfer chamber 12 until the packer plate retracts. It is noted that material wedged between the cutter and beam will be sheared only if the pressure in the line does not exceed 1500 p.s.i. However, if a piece of waste material not capable of being sheared wedges between the cutter and shear beam, the pressure switch 141 will reverse the packer plate to prevent damage to the packer unit.

In order to facilitate unloading of the receiver at the final disposal area, the receiver is provided with a tail gate 200 pivotally mounted as at 202 whereby the tail gate may be pivoted upwardly to permit unloading of the receiver through the open end. The tail gate 200 is simply a pivotally mounted rear wall for the receiver 20, the rear wall as shown in various figures of the drawing having an opening 22 therein defined by the flange 41. Thus, during loading of the receiver, the opening 22 is aligned with the outlet of the transfer chamber so that it may be filled with material and the tail gate is retained in a closed position by the latch means 160. Now when the receiver 20 is full, the opening in the receiver is closed by rods or a retainer plate and then the receiver is hauled to a distant final unloading place for the refuse. At the unloading place, the latch holding the tail gate is released to permit the entire back wall of the receiver to be pivoted outwardly thereby to facilitate dumping of the refuse material in the receiver.

The tail gate 200 is retained in a closed position (FIG. 1) by means of an over center linkage 208 including a hook 210 pivotally mounted to opposite sides of the receiver 20, each hook 210 adapted to engage a bolt 212 mounted on the tail gate. The hook 210 may be pivoted to disengage the bolt by turning the handle 216 in a clockwise direction with respect to FIG. 1 when it is desired to empty the receiver 20.

From the foregoing it is apparent that the present invention provides a new and improved system and apparatus which is extremely useful for handling waste material in an economical, efficient and sanitary manner.

While particular embodiments of the present invention have been illustrated and described herein, it is to be understood that changes and modifications in the apparatus and in the manner and sequence of the operation thereof may be incorporated within the scope of the following claims.

I claim:
1. In a refuse packer for loading waste material into a receiver having an entrance opening, a transfer chamber, means defining a discharge outlet at one end of said transfer chamber adapted to be aligned with the entrance opening in the receiver, means defining an inlet opening in one wall of said transfer chamber through which waste material enters said transfer chamber, a packer plate actuatable lengthwise of said transfer chamber between a retracted position permitting waste material to be deposited in said transfer chamber and an extended position for ejecting waste material from said transfer chamber to the receiver and compacting it therein, means for actuating said packer plate between said retracted and extended positions, a retainer plate adapted for closing the entrance opening in the receiver, latch means detachably securing said retainer plate to said packer plate, and means for securing said retainer plate over the entrance opening in the receiver, said retainer plate adapted to be carried by said packer plate during cycling thereof to fill the receiver and to be detached from said packer plate and secured over the entrance opening in the receiver when the receiver has been filled to capacity.

2. In a refuse packer as claimed in claim 1 including hydraulic actuator means for cycling said packer plate between extended and retracted positions, said hydraulic actuator including pressure responsive means for returning the packer plate from the extended position to the retracted position at a predetermined pressure build up in said hydraulic actuator.

3. A refuse packer as claimed in claim 2 including means in the hydraulic actuator circuit for maintaining the packer plate in an extended position.

4. A refuse packer as claimed in claim 1 including fastening means for securing the receiver adjacent the discharge outlet of said transfer chamber with the opening in said receiver aligned with the discharge outlet.

5. A refuse packer as claimed in claim 4 including a a bracket projecting from the sidewall of the transfer chamber, a pin on the side of the receiver and wherein the fastening means comprise at least one C-shaped clamp engaging said bracket projecting from the side wall of the transfer chamber, threaded stubs mounted on the C-shaped clamp, a hook member adapted to engage said pin on the side of the receiver and an internally threaded collar connecting said threaded stubs mounted on the C-shaped clamp and said hook member respectively.

6. In a refuse packer for loading waste material into a receiver having an entrance opening and a flange surrounding said opening having at least two aligned openings therein adapted to receive a rod therebetween to retain waste material in the receiver, a transfer chamber, means defining a discharge outlet at one end of said transfer chamber adapted to be aligned with the entrance opening in the receiver, means defining an inlet opening in one wall of said transfer chamber through which waste material enters said transfer chamber, a packer plate actuatable lengthwise of said transfer chamber between a retracted position permitting waste material to be deposited in said transfer chamber and an extended position for ejecting waste material from said transfer chamber to the receiver and compacting it therein, means for actuating said packer plate between said retracted and extended positions, means defining at least one pocket including a pivotally mounted cover flap on the front face of said packer plate adapted to be aligned with the aligned openings in the flange surrounding the entrance opening in the receiver when the packer plate is in the fully extended position whereby the rod may be inserted between the openings over the entrance opening to retain compacted refuse in the receiver, said cover flap adapted to pivot outwardly away from said packer plate to permit release of the rod from said pocket.

7. In a refuse packer for loading waste material into a receiver having an entrance opening and a flange surrounding the entrance opening having at least two aligned openings therein, a transfer chamber, means defining a discharge outlet at one end of said transfer chamber adapted to be aligned with the entrance opening in the receiver, means defining an inlet opening in one wall of said transfer chamber through which waste material enters said transfer chamber, a packer plate actuatable lengthwise of said transfer chamber between a retracted position permitting waste material to be deposited in said transfer chamber and an extended position for ejecting waste material from said transfer chamber to the receiver and compacting it therein, means for actuating said packer plate between said retracted and extended positions, a retainer plate for closing the entrance opening in the receiver, means defining at least one passageway in said retainer plate, latch means detachably securing the retainer plate to said packer plate during cycling thereof between retracted and extended positions to fill the receiver, said passageway being aligned with the openings in the flange surrounding the entrance opening in the receiver when said packer plate is in the fully extended position whereby a rod may be positioned between the openings through said passageway in said retainer plate to secure the retainer plate over the entrance opening in the receiver when the receiver has been filled to capacity.

8. In a receiver for receiving waste material from a refuse packer, a receiving compartment, a tail gate pivotally mounted at one end of said receiving compartment, latch means detachably securing the tail gate over said one end of said compartment, means defining an entrance opening in said tail gate, and retainer means adapted to be detachably secured over said entrance opening when the receiver has been filled to capacity, said tail gate adapted to be released to permit discharge of compacted waste material through said one end of said receiving compartment.

9. A refuse packer as claimed in claim 1 including guide means for guiding the packer plate for movement lengthwise of the transfer chamber comprising a pair of elongated channel-shaped stationary guide members and a pair of spaced apart upper and lower slide members projecting rearwardly from the packer plate adjacent opposite side edges thereof, the upper and lower slide members of each pair having confronting faces respectively which carry bearing strips.

10. A refuse packer as claimed in claim 1 including a shield projecting from said packer plate operable to close said inlet opening and preclude waste material from entering said transfer chamber when said packer plate is in said extended position.

11. A refuse packer as claimed in claim 1, including a shear beam adjacent the discharge outlet of said transfer chamber and a cutter projecting forwardly from the front face of said packer plate which cooperates closely with said shear beam to shear waste material trapped between the cutter and the beam during movement of the packer plate between retracted and extended positions.

12. A refuse packer as claimed in claim 1 including a pin carried on the back face of the packer plate and wherein said latch means detachably securing said retainer plate to the packer plate includes at least one pivotal hook member actuatable between a position engaging said pin carried on the back face of the packer plate to retain the retainer plate on the packer plate and a linkage mechanism including a crank arm and a cam member against which the hook engages to permit release of the hook member upon actuation of the crank arm.

13. A refuse packer as claimed in claim 1 wherein said means for securing said retainer plate over the entrance opening in the receiver includes at least one V-shaped channel member mounted on the front face of the retainer plate and extending transversely thereof to define a passageway and wherein said receiver includes a peripheral flange around the entrance opening therein, said flange having an opening therein, adapted to register with said passageway to permit insertion of a rod therethrough to hold the retainer plate over the entrance opening in said receiver.

References Cited by the Examiner

UNITED STATES PATENTS

| | | | |
|---|---|---|---|
| 1,938,463 | 12/1933 | Roberts | 100—98 |
| 2,072,706 | 3/1937 | Bower | 220—29 |
| 2,299,503 | 10/1942 | Sebell | 220—29 |
| 2,324,356 | 7/1943 | Brown | 220—55 |
| 2,591,970 | 4/1952 | Seegers et al. | 100—98 |
| 2,678,737 | 5/1954 | Mangrum | 214—17 |
| 2,705,916 | 4/1955 | Millgard | 100—51 X |
| 2,782,710 | 2/1957 | Fishburne | 100—229 X |
| 2,807,377 | 9/1957 | Pellat-Finet | 214—17 |
| 2,912,924 | 11/1959 | Dahl et al. | 100—219 |
| 3,049,250 | 8/1962 | Dempster et al. | 214—82 |
| 3,059,789 | 10/1962 | Bowles | 214—41 |

WALTER A. SCHEEL, *Primary Examiner.*

H. SCHULZ, *Examiner.*